(12) United States Patent
Depta et al.

(10) Patent No.: US 7,411,914 B2
(45) Date of Patent: Aug. 12, 2008

(54) DATA RING AND METHOD FOR OPERATING DATA RINGS

(75) Inventors: Robert Depta, Augsburg (DE);
Wolfgang Winderl, Diedorf (DE);
Reinhold Gruber, Kissing (DE);
Robert Graf, Augsburg (DE); Herbert Schur, Augsburg (DE)

(73) Assignee: Fujitsu Siemens Computers GmbH, Munich (DE)

( * ) Notice: Subject to any disclaimer, the term of this patent is extended or adjusted under 35 U.S.C. 154(b) by 855 days.

(21) Appl. No.: 10/728,387

(22) Filed: Dec. 5, 2003

(65) Prior Publication Data
US 2004/0114524 A1 Jun. 17, 2004

Related U.S. Application Data

(63) Continuation of application No. PCT/DE02/01944, filed on May 27, 2002.

(30) Foreign Application Priority Data
Jun. 5, 2001 (DE) ................. 101 27 286

(51) Int. Cl.
*H04L 12/437* (2006.01)

(52) U.S. Cl. ................................ 370/244

(58) Field of Classification Search ......... 370/221–224, 370/242–245, 258, 248–252, 403–406
See application file for complete search history.

(56) References Cited

U.S. PATENT DOCUMENTS

| | | | | |
|---|---|---|---|---|
| 4,498,082 A | * | 2/1985 | Aldridge et al. | 340/825.49 |
| 4,633,468 A | * | 12/1986 | Skatrud et al. | 714/717 |
| 4,710,915 A | * | 12/1987 | Kitahara | 370/224 |
| 4,887,256 A | * | 12/1989 | Nakayashiki et al. | 370/224 |
| 5,301,185 A | * | 4/1994 | Cherry | 370/216 |
| 5,317,198 A | | 5/1994 | Husbands | |
| 5,355,362 A | * | 10/1994 | Gorshe et al. | 370/222 |
| 5,363,366 A | * | 11/1994 | Wisdom et al. | 370/245 |
| 5,425,017 A | * | 6/1995 | Copley et al. | 370/245 |
| 5,461,628 A | * | 10/1995 | Nakamura | 714/712 |

(Continued)

FOREIGN PATENT DOCUMENTS

DE 195 03 214 C1 10/1996

(Continued)

*Primary Examiner*—Kwang B. Yao
*Assistant Examiner*—Kenan Cehic
(74) *Attorney, Agent, or Firm*—Lawrence A. Greenberg; Werner H. Stemer; Ralph E. Locher

(57) ABSTRACT

A data ring has two or more disconnectable nodes and a monitoring device for monitoring and driving the nodes. Appliances that communicate with one another can be connected to the nodes. The data ring is distinguished by an additional node that can be connected by the monitoring device. The additional node allows a fault state to be produced deliberately in the other nodes. The deliberate production of a defined fault state in the data ring and the defined propagation of this defined fault state in concatenated data rings results in states being produced in all of the nodes which correctly initiate fault handling routines in the appliances which are connected to the nodes. The fault handling routines are provided as standard and provide the appliances at the node with knowledge of the failure of the faulty node or of the addition of a new appliance at a node.

16 Claims, 4 Drawing Sheets

U.S. PATENT DOCUMENTS

| | | | |
|---|---|---|---|
| 5,491,696 A * | 2/1996 | Nishimura | 370/225 |
| 5,508,998 A * | 4/1996 | Sha et al. | 370/222 |
| 5,737,370 A | 4/1998 | Hetzel | |
| 6,088,141 A * | 7/2000 | Merli et al. | 398/5 |
| 6,175,553 B1 * | 1/2001 | Luk et al. | 370/222 |
| 6,426,962 B1 * | 7/2002 | Cabezas et al. | 370/516 |
| 6,574,192 B1 * | 6/2003 | Egnell | 370/224 |
| 6,731,597 B1 * | 5/2004 | Batchellor et al. | 370/223 |
| 7,003,705 B1 * | 2/2006 | Yip et al. | 714/717 |
| 7,016,430 B1 * | 3/2006 | Grivna et al. | 375/285 |
| 7,167,444 B1 * | 1/2007 | Afferton | 370/222 |
| 7,171,224 B2 * | 1/2007 | Sarkkinen et al. | 455/502 |
| 7,184,663 B2 * | 2/2007 | Kinoshita et al. | 398/59 |
| 2002/0009058 A1 * | 1/2002 | Kelly et al. | 370/316 |
| 2003/0031126 A1 * | 2/2003 | Mayweather et al. | 370/223 |
| 2004/0264365 A1 * | 12/2004 | Johnson et al. | 370/221 |

FOREIGN PATENT DOCUMENTS

| | | |
|---|---|---|
| DE | 199 26 569 A1 | 12/2000 |
| EP | 0 806 853 A2 | 11/1997 |

\* cited by examiner

DATA RING AND METHOD FOR OPERATING DATA RINGS

CROSS-REFERENCE TO RELATED APPLICATION

This application is a continuation of copending International Application No. PCT/DE02/01944, filed May 27, 2002, which designated the United States and was not published in English.

BACKGROUND OF THE INVENTION

Field of the Invention

The invention relates to a data ring having two or more nodes that can be disconnected and to which appliances can be connected. The nodes are provided for communication with one another. A device for fault handling is provided in the nodes. A monitoring apparatus monitors and drives the nodes.

Data rings such as these are known, for example, as a HUB. One particularly powerful variant of them operates in accordance with the fiber channel standard. The appliances that are connected to the nodes of the data ring can communicate flexibly with one another. At the same time, data is introduced into the data ring from one appliance and is read by another appliance where this is identified as being the destination appliance.

During the process of setting up a data ring such as this, initialization processes are carried out, inter alia. In the initialization processes, each appliance is registered in the data ring and a check is at the same time carried out to determine which other appliances are present with which it can communicate.

In the case of data rings of this type, the nodes have a device for fault handling which can check the data which is supplied from the appliance and can identify when faulty data signals occur. This makes it possible to identify when an appliance is faulty. When an appliance fault occurs, the device for fault handling in the node switch on an so-called bypass, which bridges that appliance. This is also then referred to as switching off that node. This ensures that only appliances that are operating correctly are included in the data ring and that the data communication always takes place correctly.

In the case of faults that could be of a temporary nature or relate to the entire data ring, there should however, often be no immediate reaction. If an appliance is disconnected in the manner described above and is removed from the data ring, there should, however, often be no immediate reaction. If an appliance is disconnected in the manner described above and is removed from the data ring by switching off a bypass, this is a very short fault for the other nodes, and generally does not lead to fault handling. It is thus possible for the other appliances that are included in the data ring not to be aware of the fact that a node has been disconnected, and subsequently to introduce data into the data ring which cannot be accessed by a another appliance. Correct operation is then no longer possible.

On the other hand, a situation occurs in which an additional appliance is connected to a node that has been switched off until then and the node is then connected. Since this appliance had not yet been connected during the process of initialization of the data ring and thus when the data ring was set up, it is still unknown to the other appliance which are connected to the other nodes and, in many cases, cannot be used correctly.

One known possible way to solve the problem is for the monitoring apparatus to monitor the nodes to determine whether any appliances have been removed from or connected to the configuration, for example whether any nodes have been connected or disconnected. The other nodes are informed via suitable fast algorithms. The solution such as this is, however, inflexible and does not operate, at least when a further data ring is connected instead of an appliance. With a concatenated data ring configuration such as this, the monitoring apparatus has no connection to the nodes in the additionally connected data ring, so that point monitoring, originating from standard logic, or driving of the appliance that are connected there is impossible.

SUMMARY OF THE INVENTION

It is accordingly an object of the invention to provide a data ring and a method for operating data rings that overcome the hereinafore-mentioned disadvantages of the heretofore-known devices and methods of this general type and that, when appliances are added and removed, the other nodes and/or appliances are reliably made aware of this. In which case, a solution such as this is intended to be flexible and must also have the capability to be used with concatenated data rings.

With the foregoing and other objects in view, there is provided, in accordance with the invention, a data ring that includes at least two disconnectable nodes, a monitoring apparatus, and an additional node. The at least two disconnectable nodes are adapted to connect to appliances and communicate with one another. In addition, the disconnectable nodes have a device for fault handling. The monitoring apparatus monitors and drives the nodes. The additional node is connected to the monitoring apparatus and allows a fault state to be produced deliberately in the other nodes.

In accordance with a further object of the invention, the data ring is distinguished by the ability to add an additional node, which can be connected by the monitoring apparatus and that allows a fault state to be initiated deliberately in other nodes that are provided in the data ring.

The advantage of the data ring according to the invention is that even short faults on one of the nodes lead to the other nodes identifying the fault and, in consequence, having the capability to carry out a reinitialization process or some other fault handling routine since the additional node that can be connected allows a fault state to be produced whose duration is sufficient in order to initiate a fault handling routine in the other nodes, when this routine identified the disconnection or the connection of nodes.

A fault state is thus produced deliberately in order to initiate fault handling routines that are provided as standard and which make the node aware of the failure of another faulty node, or of the addition of a further new node.

In one preferred embodiment, this is a fiber channel data ring, that is to say a data ring in which serial data traffic takes place using a protocol in accordance with which synchronization signals are provided. A fault state can then be produced in the other nodes by the additional node interfering with the transmission of the synchronization signals and thus initiating a synchronization fault in the other nodes. In particular, this fault state that has been produced propagates in concatenated data rings.

With the objects of the invention in view, there is also provided a method for operating a data ring according to the invention that has the advantage that optimum operation of a data ring is ensured in a small number of simple method steps.

Other features which are considered as characteristic for the invention are set forth in the appended claims.

Although the invention is illustrated and described herein as embodied in a data ring and a method for operating data rings, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
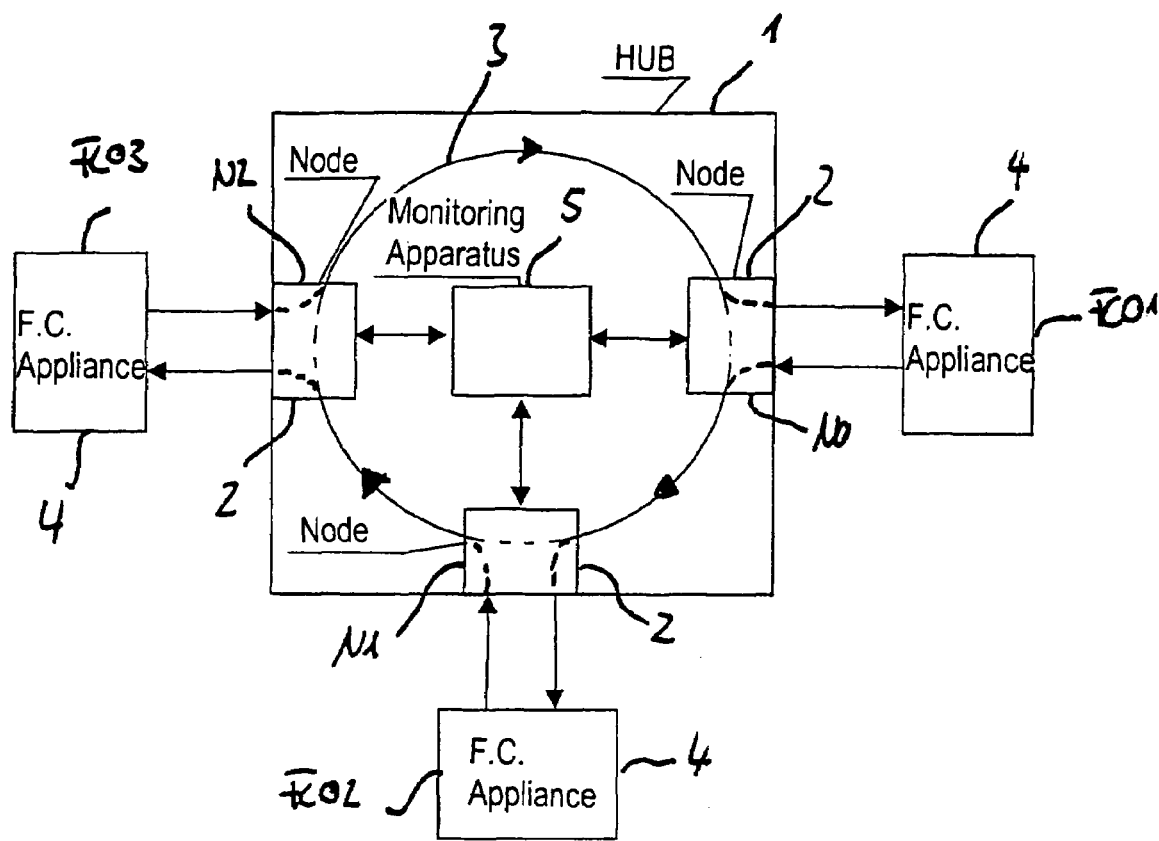
FIG. 1 is a block diagram showing a data ring according to the prior art.

Referring now to the figures of the drawings in detail and first, particularly to FIG. 1 thereof, there is shown a fiber channel HUB 1. This HUB 1 has a data ring 3, which has three nodes N0, N1, and N2. A fiber channel appliance FC01, FC02, and FC03 is connected to each of the nodes. Furthermore, a monitoring apparatus 5 is provided that monitors the nodes N0, N1, and N2. The monitoring apparatus 5 drives the nodes N0, N1, and N2. When the appliances are operating correctly, the nodes each pass the data traffic in the data ring 3 via the appliances, as is indicated by the dashed line within the nodes N0, N1, and N2. The nodes N0, N1, and N2 are then connected.

If no appliance is connected to one node, the connections for an appliance are bridged by a bypass, as is likewise indicated by a dashed line. The node is thus disconnected. The same is true when the data signals that are received from an appliance by a node are faulty. The device for fault handling in the node identify this, and connect a bypass to the appliance, so that the node is disconnected. The node, N0, N1, and N2 may in this case equipped such that the switching of a bypass is carried out automatically, controlled by a device for fault handling, or else the faulty behavior of the appliance is first of all signaled to the monitoring device 5, which then passes the command for disconnection to the appropriate node.

When setting up a data ring such as this, an initialization procedure, the so-called Loop Initialization Procedure (LIP), is carried out by the individual nodes N0, N1, and N2. The individual nodes N0, N1, and N2 therefore know which other nodes are connected to the data ring 3 and which appliances are connected to them. If, in the example shown in FIG. 1, the fiber channel appliance FC01, which is connected to the node N0, wishes to transmit data to the fiber channel appliance FC03 which is connected to the node N2, then the data to be transmitted is identified appropriately and is introduced into the data ring 3. The fiber channel appliance FC02, which is connected to the node N1, identifies the fact that the data is not intended for it, and allows the data to be passed on unchanged.

The fiber channel appliance FC03 for which the data is intended now identifies the fact that the data is intended for it and reads this data from the data ring 3.

If the appliance FC03 fails, a problem now arises in that the node N2 switches a bypass, and the data will thus circulate further in the data ring 3. Without any further measures, this would result in ever more data being introduced into the data ring 3, without this data being removed from the data ring 3 again as well. It is therefore necessary for the other appliances FC01 and FC02 to be informed that the appliance FC03 has failed. In a small configuration, such as that illustrated in FIG. 1, this may be done via the monitoring apparatus 5. However, a solution such as this, as stated in the introduction is not flexible since simple adaptation is not possible if the configuration changes.

Figure 2:
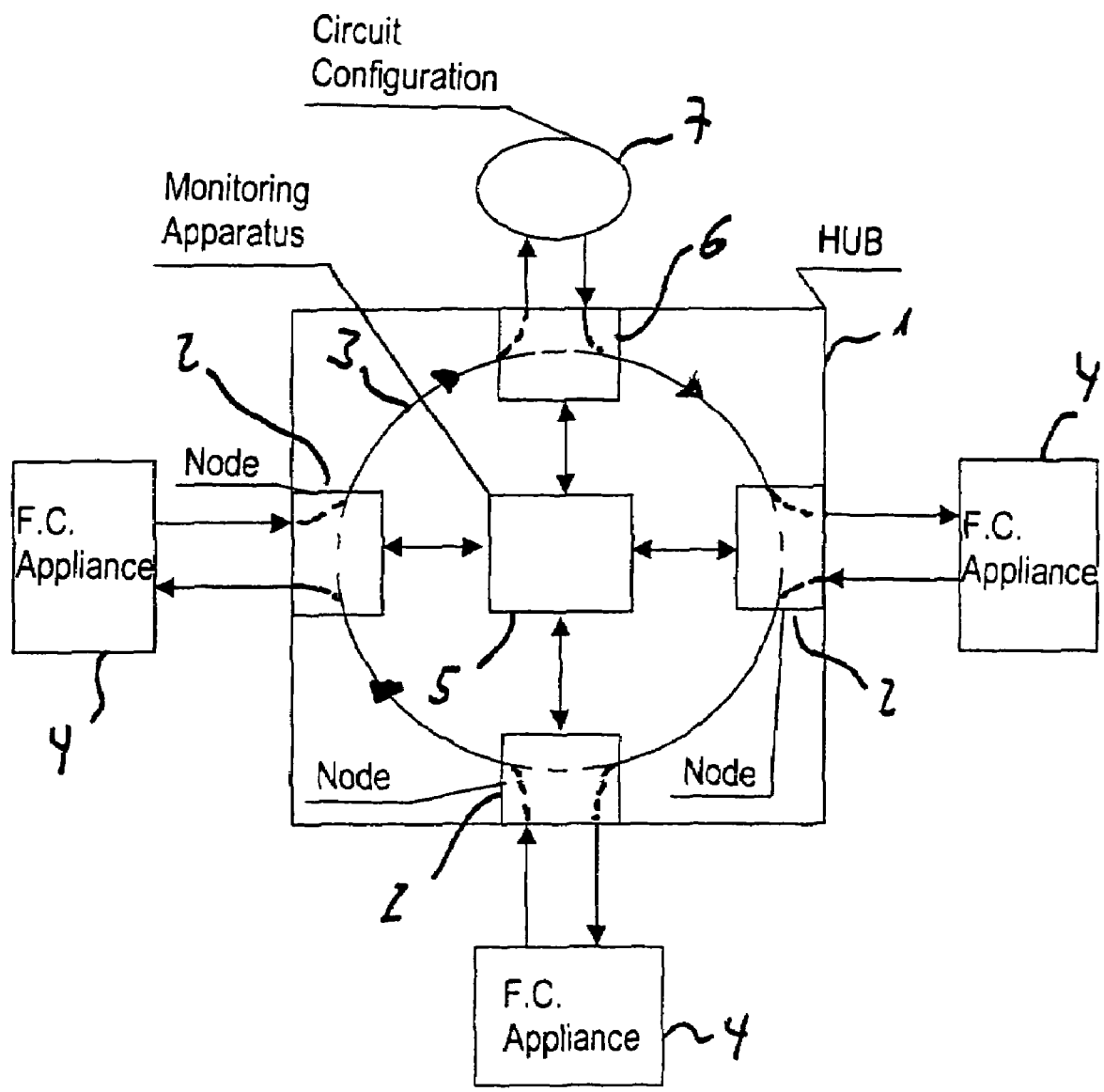
FIG. 2 is a block diagram showing a data ring according to the invention configured as a fiber channel HUB.

FIG. 2 shows a data ring according to the invention. Once again, this is a fiber channel HUB 1 with a data ring 3. The data ring 3 has an additional node 6. A special circuit configuration 7, which produces a signal that is not conformal with the fiber channel, is connected to this additional node 6 rather than a fiber channel appliance 4 as connected to the other nodes 2. While the bypass for the node 2 for a connected appliance 4 is opened, the bypass of the additional node 6 is normally closed, controlled by the monitoring apparatus 5, so that the data in the data ring 3 is not passed via the circuit configuration 7 that is connected to the node 6. The initial node 6 can likewise be driven by the monitoring apparatus 5.

If a faulty signal is now found in one of the other nodes two by the appliance 4 which is connected to it then, as already described, the bypass is closed and the node is disconnected, together with the appliance 4. The monitoring apparatus 5 now knows that that node has been disconnected. In a first phase of the fault handling process, the additional node 6 is connected. In consequence, the data traffic in the data ring 3 runs via the additional circuit configuration 7. In a second phase of the fault handing process, the other nodes 2 are now forced not to be disconnected, but are held in the data ring 3. At the same time, the circuit configuration 7 produces a faulty signal, that is to say a signal that does not conform with the fiber channel, and that is fed into the data ring 3. If the fiber channel protocol is used, as is described here, the synchronization signals are interfered with. In the intact nodes 2, this leads to the so-called "loss-of-sync" fault being identified. According to the appliance specifications for node modules, a loss-of-sync fault which is present for a specific minimum time initiates a reinitialization process, a so-called "Loop Initialization Procedure" (LIP). Since the fault has occurred in all of the nodes, as when the data ring was set up, all the intact nodes 2 confirm which other appliances are currently held in the data ring 3. This process identifies which of the appliances 4 and which of the associated nodes 2 are deflective and can thus no longer be addressed by the appliance.

Once this fault handling phase has been completed, the faulty node is finally removed from the data ring 3 in a third fault handling phase, and correct operation of the data ring is subsequently possible once again.

Figure 3:
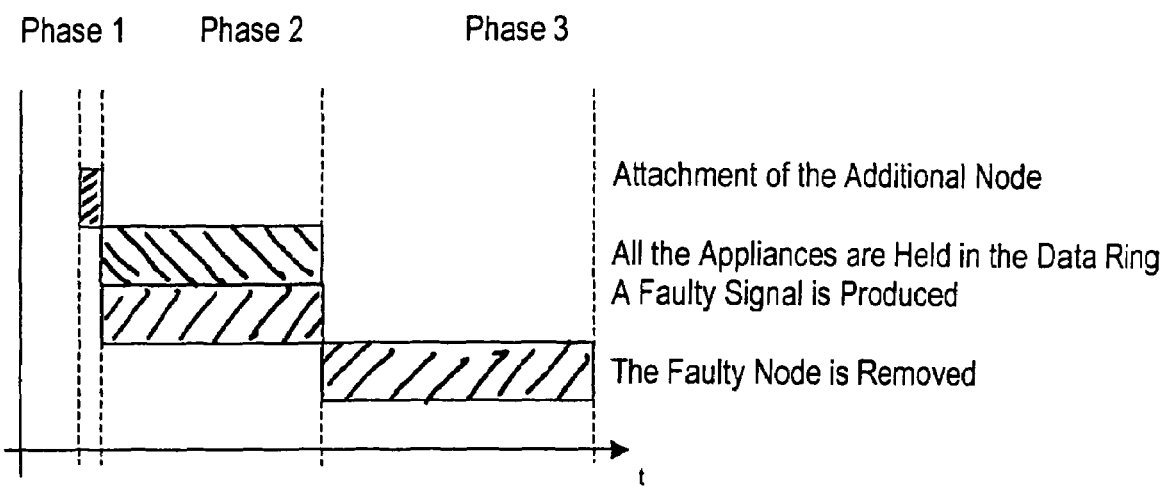
FIG. 3 is a graph illustrating a method according to the invention.

The procedure when a fault occurs is illustrated once again the in form of a diagram in FIG. 3. In one preferred practical embodiment of the data ring according to the invention or of a method according to the invention, the additional node is connected within 1 ms. The second phase, in which all the appliances are held in the data ring and a faulty signal is at the same time produced by the additional node in the fiber channel convention, lasts for 108 ms. The third phase, in which the faulty node is removed from the data ring, that is to say it is disconnected, has an intended duration of 177 ms. This process is compliant with node modules which typically carry out a loop initialization procedure once a loss-of-sync fault has lasted for 100 ms. The third phase prevents a total shut down of the common data ring when HUBs which operate in the same way are concatenated.

Figure 4:
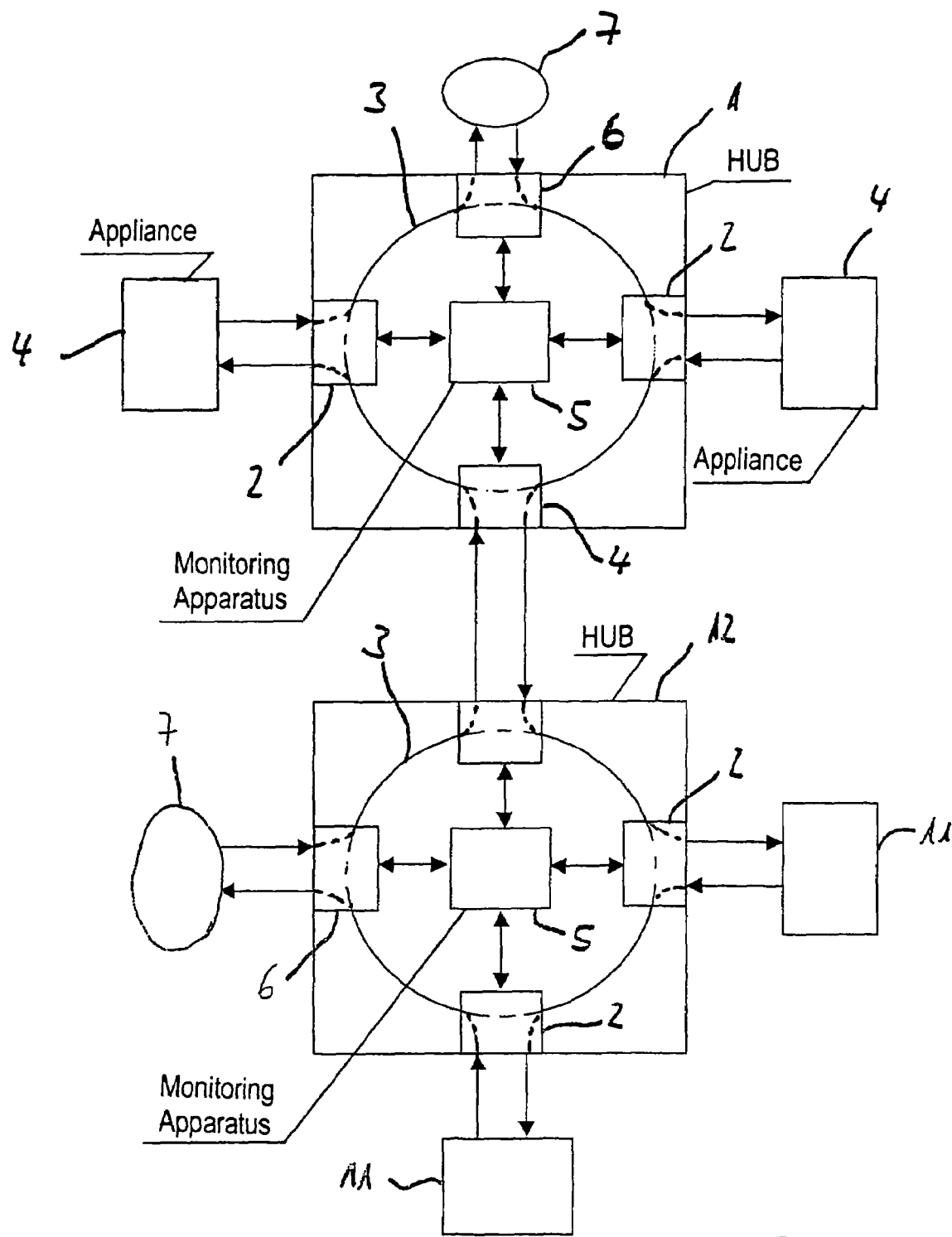
FIG. 4 is a block diagram showing a data ring according to the invention in a concatenated configuration.

FIG. 4 clearly shows how a data ring according to the invention can be used in a concatenated configuration. This clearly shows the advantages with regard to flexibility offered by the solution according to the invention over control via the monitoring apparatus.

The upper part of FIG. 4 shows HUB 1 with a data ring 3 according to the invention, as has already been described with reference to FIG. 2. One of the appliances 4 has been omitted, and, instead of this, the second HUB 12 has been connected, which is configured conventionally, in a corresponding manner to FIG. 1. Fiber channel appliances 11 are also connected to the second HUB 12. If a fault now occurs in one of the appliances 4 that are connected to the first HUB 1, then, as described initially, it would also be possible to carry out a fault handling routine using the monitoring apparatus 5. In a concatenated configuration, as is illustrated in FIG. 4, the monitoring apparatus 5 for the first HUB cannot, however, monitor or influence the operating state of the nodes 2 or of the appliances 11 for the second HUB 12 which are connected to it. In the case of data rings according to the prior art, it was impossible for the HUB 1 to initiate a loop initialization procedure for the node 2 in the second HUB 12.

In the case of a refinement of the data ring 3 for the HUB 1, according to the invention, as has been described with reference to FIG. 3, the faulty signal produced by the additional node 6, that is to say the signal which is not conformal with the fiber channel, propagates and thus also reaches the second HUB 12 and the nodes 2 and appliances 11 connected to it. In this case as well, a loss-of-sync fault occurs which, after a certain time period leads to a Loop Initialization Procedure. As soon as a fault has been identified, an additional node 6 with the special circuit configuration 7 connected to it is activated in this case as well, and the nodes 2 would be held in the data ring since, otherwise the occurrence of a fault would result in automatic disconnection of the nodes. Since a Loop Initialization Procedure is always intended to be carried out in fiber channel nodes, a data ring according to the invention can be coupled to any other desired fiber channel data rings which are configured according to the invention, so that the advantages according to the invention also extend to these data rings. There is no need for any additional monitoring apparatus at a higher level than the data rings to pass on the information about the connection and disconnection to connected data rings.

We claim:

1. A hub, comprising:
    a data ring including at least two disconnectable nodes for connecting to appliances and communication with one another by passing data traffic in said data ring in a data traffic direction, said at least two disconnectable nodes each having a device for fault handling;
    a monitoring apparatus for monitoring and driving said at least two disconnectable nodes, said monitoring apparatus being connected to each one of said at least two disconnectable nodes; and
    an additional node different from said at least two disconnectable nodes, said additional node connected to said monitoring apparatus and allowing a fault state to be produced deliberately in said disconnectable nodes by feeding a faulty signal into said data ring in the direction of the data traffic in order to activate a loop initialization procedure.

2. The hub according to claim 1, wherein serial data traffic is carried in said data ring using a protocol including synchronization signals.

3. The hub according to claim 2, wherein a configuration of said additional node corresponds to a configuration of said disconnectable nodes; and
    a circuit configuration producing a signal not complying with said protocol and connected as said appliance.

4. The hub according to claim 1, wherein the data ring is a fiber channel data ring.

5. The hub according to claim 3, wherein said additional node interferes with transmission of the synchronization signals to initiate a synchronization fault in said disconnectable nodes.

6. The hub according to claim 5, wherein said disconnectable nodes reinitialize upon a data ring fault.

7. The hub according to claim 5, wherein said disconnectable nodes reinitialize upon the synchronization fault.

8. The hub according to claim 6, wherein said monitoring apparatus holds said disconnectable nodes in the data ring during the production of the data ring fault in said disconnectable nodes.

9. A method for operating a hub, which comprises:
    providing a data ring including:
        a data ring including at least two disconnectable nodes for connecting to appliances and communication with one another by passing data traffic in the data ring in a data traffic direction, and
        a monitoring apparatus for monitoring and driving the at least two disconnectable nodes, the monitoring apparatus being connected to each one of said at least two disconnectable nodes, and
        an additional node different from the at least two disconnectable nodes and arranged in the data ring, the additional node driveable by the monitoring apparatus and producing a fault state deliberately in the disconnectable nodes;
    connecting the additional node by the monitoring apparatus after one of the at least two disconnectable nodes has been disconnected or connected;
    producing said fault state in the disconnectable nodes by feeding a faulty signal into the data ring in the direction of the data traffic while holding the disconnectable nodes in the data ring in order to activate a loop initialization procedure; and
    removing said one of the at least two disconnectable nodes from the data ring, if said one disconnectable node has been disconnected, or adding said one disconnectable node to the data ring, if said one disconnectable node has been connected.

10. A hub comprising:
    a data ring including at least two disconnectable nodes for connecting to appliances and communication with one another by passing data traffic in the data ring in a data traffic direction, said at least two disconnectable nodes each having a device for fault handling;
    a monitoring apparatus for monitoring and driving said at least two disconnectable nodes, said monitoring apparatus being connected to each one of said at least two disconnectable nodes; and
    an additional node different from said at least two disconnectable nodes, said additional node connected to said monitoring apparatus and allowing a fault state to be produced deliberately in said disconnectable nodes, wherein said monitoring apparatus holds said disconnectable nodes in the data ring while producing said fault state in said disconnectable nodes by feeding a faulty signal into the data ring in the direction of the data traffic in order to activate a loop initialization procedure.

11. The hub according to claim 10, wherein the data ring is a fiber channel data ring.

12. The hub according to claim 10, wherein serial data traffic is carried in the data ring using a protocol including synchronization signals.

13. The hub according to claim 12, wherein:

said additional node is configured to correspond to a configuration of said disconnectable nodes; and at least one of said appliances is a circuit configuration producing a signal not complying with said protocol.

14. The hub according to claim 13, wherein said additional node interferes with transmission of the synchronization signals to initiate a synchronization fault in said disconnectable nodes.

15. The hub according to claim 14, wherein said disconnectable nodes reinitialize upon a data ring fault.

16. The hub according to claim 14, wherein said disconnectable nodes reinitialize upon the synchronization fault.

* * * * *